A. JUNGHANS.
WEIGHT OPERATED MECHANICAL TIME FUSE.
APPLICATION FILED FEB. 4, 1914. RENEWED MAR. 21, 1918.

1,266,687.

Patented May 21, 1918.

WITNESSES:
Fred White
Gustave R. Thompson

INVENTOR:
Arthur Junghans,
By Attorneys,
Fraser, Trask and Myers

UNITED STATES PATENT OFFICE.

ARTHUR JUNGHANS, OF SCHRAMBERG, GERMANY.

WEIGHT-OPERATED MECHANICAL TIME-FUSE.

1,266,687.      Specification of Letters Patent.      Patented May 21, 1918.

Application filed February 4, 1914, Serial No. 816,598. Renewed March 21, 1918. Serial No. 223,800½.

*To all whom it may concern:*

Be it known that I, ARTHUR JUNGHANS, privy commercial councilor, a subject of the King of Wurttemberg, residing at Schramberg, Wurttemberg, Germany, have invented certain new and useful Improvements in Weight-Operated Mechanical Time-Fuses, of which the following is a specification.

This invention relates to weight-operated mechanical time-fuses, the construction of the fuse being such that the same is rendered more useful than hitherto especially for heavy guns.

The clockwork fuses hitherto adopted are usually spring driven. It has however been proved that the spring driven mechanism does not fully meet the demands with regard to precision, and this is supported by the fact that notwithstanding the practically perfect construction of the single parts, such clockwork operated fuses with spring drive have not been universally adopted. This is mainly due to the fact that the spring does not insure that uniformity of power transmission, which is required for the purpose of preventing dispersion especially for projectile fuses. Even though—as already proposed—the number of vibrations of the balance was considerably increased (up to 300 vibrations per second), experience has shown that the required uniformity has not been attained. Moreover, even the said relatively large number of 300 vibrations per second, which represents the practically permissible utmost or extreme limit for spring mechanism, is by no means sufficient for heavy guns in order to render the troublesome influences of irregular weight-distribution, etc., undetrimental. The results for field guns are also so variable that it may be regarded as proven that even the maximum increase of the number of vibrations in connection with spring-driven fuses never absolutely guarantee the required precision for these guns and this is chiefly due to the fact that in the case of higher numbers of vibrations, the balance is more sensitive to the irregularities of the driving power.

The object has however also not been attained by the proposed, but not practically carried out, driving of the clockwork by centrifugal force, because a spring had also to be resorted to for balancing the centrifugal force. It will never be possible in practice to so adapt the spring in each individual case that its tension is always constant, so that owing to the want of a perfect action of the balancing member, the first and essential condition for the required most precise regulation or adjustment of the mechanism, *i. e.* a most uniform driving power, is not fulfilled.

All these circumstances have led the inventor to create a novel driving and regulating or adjusting means, which embodies the advantages of the hitherto known or proposed types but completely obviates their disadvantages. The novel arrangement consists in the combination of an absolutely springless and yet balanced weight-drive (wherein the momentum of force is balanced by suitably varying the weight driving force or the leverage according to United States Patent 1,069,094, of the inventor) with such an escapement, whose balance is accelerated beyond the practically permissible limit for spring mechanism and whose anchor is adjusted for mixed escapement (the one pallet adjusted to rest and the other to release).

By this combination alone, all demands can be theoretically and practically fulfilled and the most uniform regulation or adjustment can be attained.

By the adoption of the first important element in this new combination, the defects peculiar to the spring driving system are entirely dispensed with. This element also permits the use of the second element, namely, the balance with a number of vibrations exceeding the practically permissible maximum number of vibrations for spring mechanism. A number of vibrations of at least 400 may thus be advantageously used, if necessary, whereas, in connection with spring mechanism, this number of vibrations would be impossible in view of the permissible maxium strength of the spring and the danger of breakage increasing with the increasing strength of the spring, as well as the irregularity of the power-transmission. Finally, the third element, namely, the adjustment of the anchor for mixed escapement also enables an easy start and a good regulation, while, on the contrary, in the case of a repose-escapement alone, the starting is not always possible, and, in the case of a recoil escapement, only a slight regulating capacity is attainable.

Referring to the accompanying drawing, Figure 1 is a general view of a time-fuse embodying the present improvements, the view being partly a vertical section and partly a side elevation.

Figure 1:
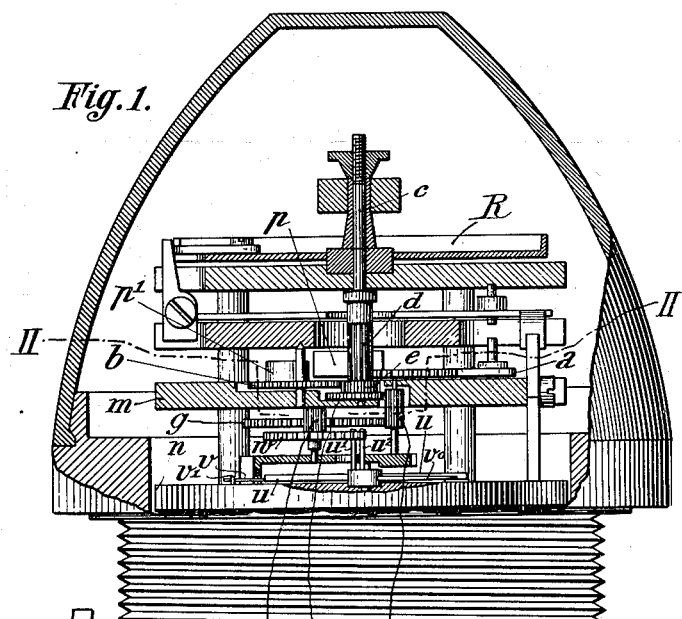
Figure 3:
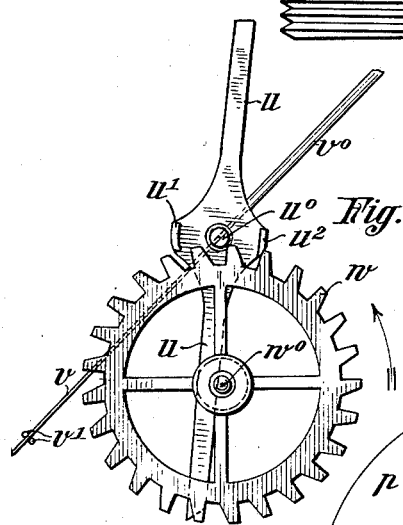
Fig. 3 and 4 are detail views of the escapement, Fig. 3 showing the pallets in one position, and Fig. 4 showing the pallets in another position.
Figure 4:
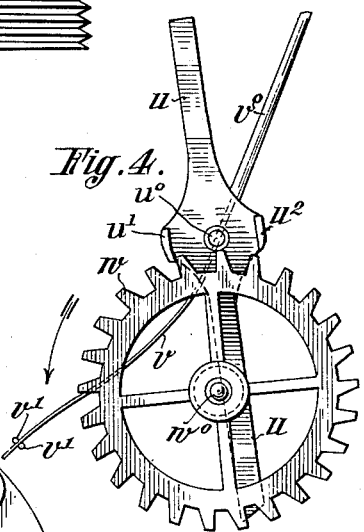
Figure 2:
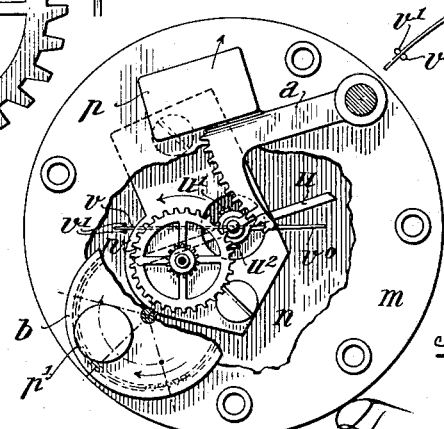
Fig. 2 is a sectional view following generally the line 2—2, Fig. 1.

Referring to Figs. 1 and 2, the driving weights and the train of gears are mounted principally upon two plates $m$ and $n$, the arrangement being similar to that illustrated and described in my U. S. Patent No. 1,069,094. $p$ designates the centrifugal driving weight mounted upon an arm $a$ having a rack thereon meshing with a pinion $d$ upon the shaft $c$ carrying the timing disk R. The force exerted by the weight $p$ is modified by a weight $p'$ carried upon a toothed plate $b$ meshing with a pinion $e$ fast upon the same shaft $c$ with which the rack on the arm $a$ meshes. The weight $p'$ is preferably adapted to swing outward during the initial movement of the weight $p$, to augment the force of the weight $p$, (when the force exerted by the weight $p$ is relatively small) and to swing inward during the latter part of the movement of the weight $p$, to diminish the force of the weight $p$, (when the force exerted by the weight $p$ is relatively large). The force exerted by the weight $p$ upon the shaft $c$ is by this means made practically uniform.

Connected to the shaft $c$, through a suitable train of gears, $f, g, h, i$, is an escape wheel $w$. Coacting with the escape wheel $w$ is a balance $u$ having two pallets $u^1$, $u^2$, thereon. One of the pallets, $u^1$, is a stop or arresting pallet, and the other, $u^2$, is a recoil pallet. The escapement is a mixed escapement, the pallet $u^1$ functioning with the escape wheel as a repose or dead-beat escapement, and the pallet $u^2$ functioning with the escape wheel as a recoil escapement. The construction and operation of this kind of an escapement is well understood by persons versed in the art of clock-making. The escape wheel is pivoted at $w^0$, and the balance $u$ upon the pivot $u^0$. $v$ is the balance spring. The balance spring is wedged in a hole formed in the balance $u$, by a tapered pin $v^0$. The pin $v^0$ is prolonged, and acts to counterbalance the weight of the spring. The outer end of the spring $b$ is held between two pins $v^1$, which are moved lengthwise of the spring, for adjusting the working length of the spring, and thereby effecting a regulation of the action of the escapement.

It may be advantageously pointed out herein that the mixed escapement, according to the present invention, admits of a considerably higher number of oscillations of the balance per unit of time, and admits of greater reliability in starting and accuracy in working than is obtainable by other styles of escapement. If the two pallets were adapted for rest or dead-beat escapement, the starting of the mechanism could not be depended upon under all circumstances. If the two pallets were adapted for recoil escapement, there would be attained a relatively imperfect action of the escapement, as regards regularity.

I claim:

1. In a time-fuse for projectiles, the combination of ignition means, a clock-work, a driving weight and a mixed escapement.

2. In a time-fuse for projectiles, the combination of ignition means, a clock-work, a compensated centrifugal driving weight, and a mixed escapement.

In witness whereof, I have hereunto signed my name in the presence of two subscribing witnesses.

ARTHUR JUNGHANS.

Witnesses:
FRIDA KLAIBER,
ERNEST ENTENMANN.